United States Patent [19]

Roberts et al.

[11] Patent Number: 5,071,086
[45] Date of Patent: Dec. 10, 1991

[54] CLICK MECHANISM FOR DRAG ADJUSTMENT ON A FISHING REEL

[75] Inventors: Dennis E. Roberts, Owasso; Robert L. Carpenter, Tulsa, both of Okla.

[73] Assignee: Zebco Corporation, Tulsa, Okla.

[21] Appl. No.: 557,364

[22] Filed: Jul. 24, 1990

[51] Int. Cl.⁵ .............................................. A01K 89/015
[52] U.S. Cl. ..................................... 242/268; 242/283
[58] Field of Search ............... 242/268, 283, 296, 306, 242/307, 308

[56] References Cited

U.S. PATENT DOCUMENTS

| | | | |
|---|---|---|---|
| 2,180,321 | 11/1939 | Kovalovsky et al. | 242/308 X |
| 2,209,598 | 7/1940 | Coxe | 242/268 |
| 2,485,741 | 10/1949 | King | 242/268 X |
| 2,569,006 | 9/1951 | King | 242/268 X |
| 3,971,530 | 7/1976 | Murvall | 242/268 |
| 4,496,115 | 1/1985 | Kreft et al. | 242/306 |
| 4,513,925 | 4/1985 | Yamaguchi | 242/306 X |
| 4,548,370 | 10/1985 | Noda | 242/268 X |
| 4,591,108 | 5/1986 | Ban | 242/306 X |
| 4,741,489 | 5/1988 | Emura et al. | 242/268 |
| 4,943,012 | 7/1990 | Aoki | 242/307 X |

FOREIGN PATENT DOCUMENTS

| | | | |
|---|---|---|---|
| 215251 | 9/1967 | Sweden | 242/268 |
| 711126 | 6/1954 | United Kingdom | 242/268 |

*Primary Examiner*—Katherine Matecki
*Attorney, Agent, or Firm*—Wood, Phillips, Mason, Recktenwald & VanSanten

[57] ABSTRACT

An improved fishing reel of the type having a frame, a line-carrying spool carried by a shaft and mounted for rotation relative to the frame about a first axis, a crankshaft mounted for rotation relative to the frame about a second axis, a crank handle for rotating the crankshaft, and means including a drag apparatus for transmitting rotational movement of the crankshaft about the second axis into rotational movement of the spool shaft and spool about the first axis. The drag apparatus is adjusted by a drag-adjusting knob coaxially mounted on the crankshaft. The improvement resides in structure for signaling, audibly or by feel, that the drag on the spool is being changed either by increasing or decreasing the drag setting when the drag-adjusting knob is turned relative to the crankshaft.

6 Claims, 1 Drawing Sheet

CLICK MECHANISM FOR DRAG ADJUSTMENT ON A FISHING REEL

BACKGROUND OF THE INVENTION

1. Field of the Invention

This invention relates to a fishing reel and, more particularly, to a structure for indicating that the drag on the line spool is being adjusted.

2. Background of the Invention

In almost every type of fishing reel, an apparatus is provided for applying a drag to the line-carrying spool so that any pull on the line, such as when a fish takes a bait, in excess of the drag setting will cause the spool to turn relative to the drag member.

Heretofore, many fishing reels did not have an apparatus for advising the fisherman that the drag was being adjusted. The star drag-adjusting knob was turned, but there was no way the fisherman could tell, either by sound or by feel, whether or not the drag setting was being changed. The result was that the drag may be set too high and the fish pulling on the line could break the line, or the drag may be set too low so that the fish pulling on the line can run freely with the bait, permitting the fish to dive and escape or to entangle the line in underwater obstacles and the like.

SUMMARY OF THE INVENTION

The present invention overcomes the above enumerated problem by providing a signal which can be heard and felt when the drag setting is being changed.

A click spring and uniformly spaced serrations are provided between the drag-adjusting knob and the crankshaft so that movement of the drag-adjusting knob relative to the crankshaft will generate a click for each serration over which the click spring moves, signaling the fisherman that drag adjustment has taken place. Some fishermen will develop a feel sensitivity such that , even though they may not hear the clicks, they will feel the click through their fingers on the drag-adjusting knob. The click spring may be located on one of either the drag-adjusting knob or on the crankshaft, with the circularly oriented, uniformly spaced serrations located on the other of the drag-adjusting knob or the crankshaft.

Accordingly, it is an object of the present invention to provide a drag structure on a baitcast-type reel having a signal to indicate change in the drag setting.

It is another object of the present invention to provide a drag structure having a simple resilient member mounted either on the drag-adjusting knob or on the crankshaft in overlapping relationship with uniformly spaced protrusions or serrations on the other of the drag adjusting knob or the crankshaft so that relative movement will produce an audible clicking sound, which click can also be sensed by feel in the hand of the fisherman.

DESCRIPTION OF THE PREFERRED EMBODIMENT

Figure 1:
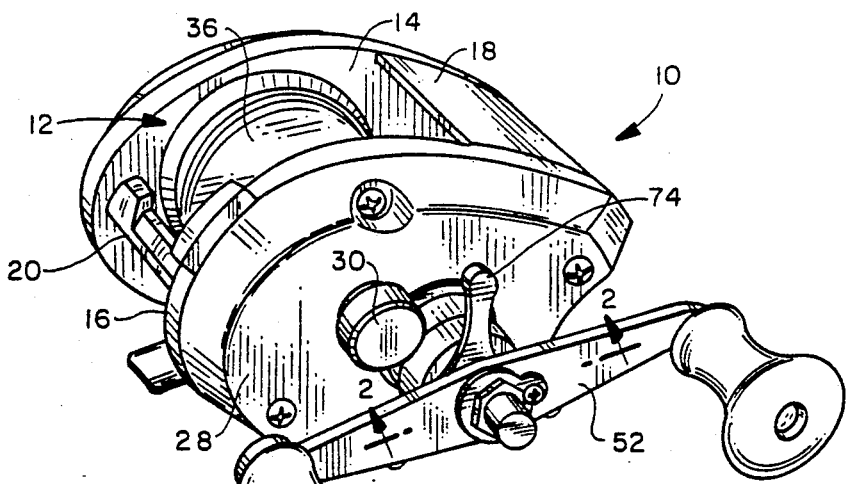
FIG. 1 is a perspective view of a fishing reel, in this case, a baitcast reel, in which the signal-generating structure is mounted according to the present invention.

Referring initially to FIG. 1, a fishing reel 10, in this case a baitcast-type reel, suitable for incorporation of the present invention, is shown. It is understood that the invention could be incorporated in other type reels, such as a spincast reel, where the drag-adjusting knob and crank handle are mounted for relative movement about a common axis, i.e. the axis of the crankshaft.

The reel 10 consists of a frame 12 having spaced, side frame members, or plates, 14, 16 interconnected by posts 18,20. A spool shaft 22 is mounted in bearings 24 (only one being shown) in the side frame members 14,16 and projects into and through a cavity 26 bounded by the side frame member 16 and a cup-shaped side cover 28. A bearing cap 30 is threaded on to a lug 32 on the side cover 28 providing end thrust support to the spool shaft 22, as is well-known in the art. A driven pinion gear 34 is keyed to rotate with the spool shaft and is axially slidable on said spool shaft. The driven gear 34 is operatively manipulated by a clutch apparatus, not shown, that is well-known in the art. A line spool 36 is mounted on the spool shaft and carries a supply of fishing line 38.

A crankshaft 40 is mounted for rotation on the frame by bearings 42 and 44 located in the side cover 28 and the side frame member 16, respectively. A retainer 46 retains the bearings 44 and 24 in their respective seats and is held to the side frame 16 by screw 48. The retainer 46 nests in an undercut 50 in the crankshaft 40 to retain the crankshaft against axial movement while allowing for free rotational movement about its longitudinal axis.

A crank handle 52 is keyed on the end of the crankshaft, whereby rotating the handle will rotate the crankshaft A conventional drag apparatus 54 is mounted on the crankshaft, and in the apparatus shown, comprises a drag washer 56 keyed on the end portion of the crankshaft and is backed by a lock washer 58 such that the drag washer 56 rotates with the crankshaft but cannot move axially relative to the crankshaft The drag washer 56 has a friction pad 60 facing axially and in friction contact with one face of a driving gear 62 The driving gear 62 is freely rotatably and axially movable on the crankshaft 40 The driving gear 62 meshes with the driven gear 34 on the spool shaft 22 A second drag washer 64 is keyed to the crankshaft 40 so as to rotate with the crankshaft 40 but is free to move axially relative to the crankshaft A friction pad 66 is positioned on the axial face of the second drag washer 64 and is mounted for friction-engaging contact with the other face of the driving gear 62.

Spacer member 68 is slidably mounted axially on the crankshaft 40 and bears, at one end, against the second drag washer 64 and bears, at its other end, against the axially movable bearing 42 in an opening 70 in the side cover 28. Belleville springs 72 encircle the crankshaft 40 with a drag-actuating knob, or star drag, 74 threaded at 75 on the crankshaft 40 and having a sleeve portion 76 bearing against one side of the Belleville springs.

Heretofore, turning the drag-adjusting knob 74 in one direction relative to the crankshaft urged the springs 72, spacer 68 and second drag washer 64 against the driving gear 62 and drag washer 56 to increase the drag on the driving gear 62. Turning the drag-adjusting knob 74 in the opposite direction would reduce the force on the drag washers and driving gear, thereby relieving the drag on the driving gear.

Figure 2:
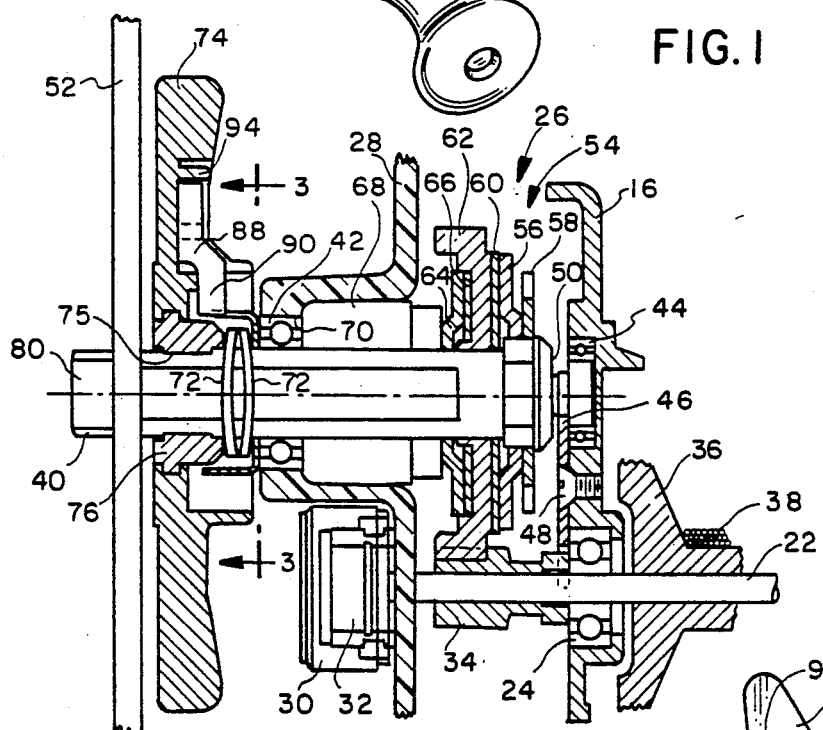
FIG. 2 is an enlarged cross-sectional view of the drag apparatus in which the signal-generating structure is installed, taken along the line 2—2 of FIG. 1.
Figure 3:
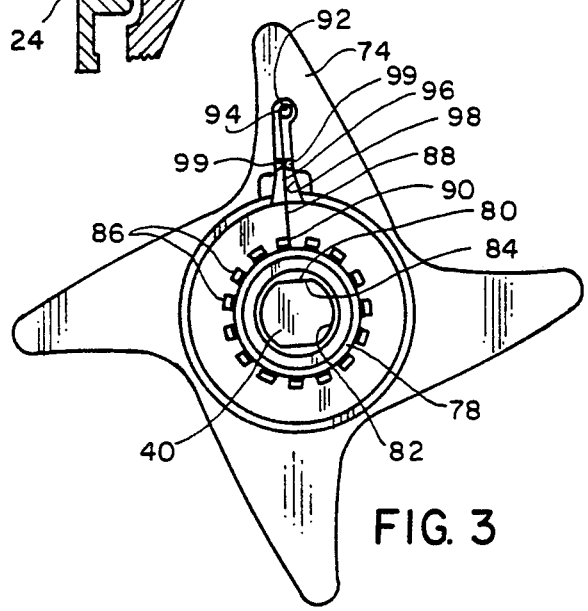
FIG. 3 is a cross-sectional view of the signal-generating structure taken along the line 3—3 of FIG. 2.

The improvement comprises including a structure for sensing the changing of a drag setting. The sensing may be audible or by feel. In particular, as best shown in FIGS. 2 and 3, a disc-shaped member 78 is keyed to the crankshaft by mating a flat 80 in an opening 82 in the disc-shaped member, with a flat 84 on at least one side of the crankshaft 40. The disc-shaped member 78 has a plurality of equally spaced-apart, axially extending serrations, or teeth, 86 forming a circle about the center of the crankshaft The disc-shaped member 78 is pressed between the one Belleville spring 72 and the bearing 42. A resilient click spring 88 is fixed in one leg of the drag-adjusting knob 74 and has one extended end portion 90 projecting radially toward the crankshaft and fits loosely between two adjacent serrations 86 on the disc-shaped member 78. The click spring 88 has a fastening end portion 92 bent in a way as to pass around a post 94 in the drag-adjusting knob 74 The body 96 of the spring lies in a groove 98 in the leg of the drag knob 74. The groove 98 has a pair of facing lugs 99 engaging opposite sides of the spring 88 intermediate its fastened end portion 92 and its projecting end portion 90. The intermediate support of the spring 88 by the lugs stiffens the spring, resulting in a crisper, sharper clicking sound and a more defined vibration to the reel that will more likely be sensed by a fisherman.

As the drag-adjusting knob 74 is rotated relative to the crankshaft (and likewise relative to the crank handle 52), the projecting end 90 of the click spring 78 will be moved first into contact with one serration 86, whereupon the spring 78 will deflect as the spring passes over the serration. When the spring 78 passes beyond the serration, it will click or snap into the now aligned space between the next two adjacent serrations. As the drag knob is turned, the spring will produce the audible clicks at each serration. The snapping of the spring into the space between serrations produces a small but discernible vibration to the drag knob and to the reel frame. Sometimes, noises around the fisherman, i.e. high winds, boat motor noises, and the like, will drown out the audible clicking sound, whereupon the fisherman can sense the clicks by the vibrations into his hand on the reel. There are other times when cold hands or the like will dull the vibrations from the click spring, but the fisherman is more than likely able to hear the drag-adjusting audible clicking sound.

It should be understood that the serrations on the disc 78 could project radially into overlapping relationship with the click springs 78. It is also considered within the context of the invention to reverse the parts, that is, mount the spring 78 on the crankshaft projecting radially of the crankshaft and mount the disc-shaped member with the circular, equally spaced serrations 86 on the drag-adjusting knob. Different securing systems for affixing the click spring to the drag-adjusting knob 74 are contemplated, s long as the projecting end of the spring extends radially into overlapping relationship between adjacent serrations on the disc-shaped member.

The foregoing disclosure of specific embodiments is intended to be illustrative of the broad concepts comprehended by the invention.

We claim:

1. In a fishing reel having a frame, a line-carrying spool carried by a first shaft and mounted for rotation relative to the frame about a first axis, a crankshaft mounted for rotation relative to the frame about a second axis, a crank handle for rotating the crankshaft, a drag washer fixed on said crankshaft, a second drag washer axially slidable on and rotatably driven by said crankshaft, a driving gear rotatably mounted relative to said crankshaft and frictionally engaged between said drag washers, said driving gear operably engaging a driven gear on said first shaft for transmitting rotational movement of the crankshaft about the second axis into rotational movement of the spool shaft and the spool about the first axis, and a drag adjusting knob having an axially inwardly facing side, said drag adjustment knob being threaded on said crankshaft, resilient means between said drag-adjusting knob and said second drag washer, said drag-adjusting knob, upon being turned relative to the crankshaft, adjustably and resiliently urging said drag washers against said driving gear, characterized by:

means for audibly and by feel signaling the turning of said drag adjusting knob relative to said crankshaft, said means comprising (A) a click spring carried on the axially inwardly facing side of said drag adjusting knob, said click spring having a portion freely projecting toward said crankshaft, (b) a disc-shaped member keyed to said crankshaft for rotation with said crankshaft, said disc-shaped member having serrations extending into overlapping relationship with said freely projecting portion of said click spring, said freely projecting portion of said click spring being positioned between two adjacent serrations on said disc member, and said drag-adjusting knob, when turned relative to said crankshaft will produce a clicking sound and a clicking sensation in the drag-adjusting knob as the click spring snaps from one serration to the next on the disc-shaped member to signal the change in the adjustment of the drag between the crank handle and the spool.

2. In the fishing reel as claimed in claim 1, wherein said serrations on the disc-shaped member extend axially of said disc into overlapping relationship with the click spring.

3. In a fishing reel having a frame, a line-carrying spool carried by a first shaft and mounted for rotation relative to the frame about a first axis, a crankshaft mounted for rotation relative to the frame about a second axis, a crank handle fixed on the crankshaft for rotating the crankshaft, a driving gear rotatably mounted relative to said crankshaft, means for applying a drag force to said driving gear, a driven gear on said first shaft, said driving gear meshing with said driven gear for transmitting rotational movement of the crankshaft into rotational movement of the spool shaft, and a drag-adjusting knob having an axially inwardly facing side, said drag adjustment knob being threaded on said crankshaft, characterized by:

signaling means for audibly and by feel signaling the turning of said drag-adjusting knob relative to said crankshaft, said signaling means comprising (a) a click spring carried on the inwardly facing side of said drag-adjusting knob, (b) means keyed to said crankshaft for rotation with said crankshaft, said means keyed to said crankshaft having serrations lying in overlapping relationship with a portion of said click spring, whereby turning said drag-adjusting knob relative to the crankshaft will produce an audible click and clicking sensation in the drag-adjusting knob each time the click spring snaps past one of the serrations on the means keyed to the crankshaft.

4. In the fishing reel as claimed in claim 3, wherein said means keyed to said crankshaft comprises a disc-shaped member having the serrations lying in a circle which has a center at the center of the crankshaft.

5. In the fishing reel as claimed in claim 3, wherein said means keyed to said crankshaft comprises a disc-shaped member having the serrations extending axially of the disc-shaped member and wherein said click spring has a portion freely projecting in a radial direction and lying between two adjacent serrations whereby turning said drag-adjusting knob will move the click spring past successive serrations producing an audible click as the spring passes each serration.

6. In a fishing reel having a frame, a line-carrying spool carried by a first shaft and mounted for rotation relative to the frame about a first axis, a crankshaft mounted for rotation relative to the frame about a second axis, a crank handle for rotating the crankshaft, a driving gear rotatably mounted relative to said crankshaft, means for applying a drag force to said driving gear, a driven gear on said first shaft, said driving gear meshing with said driven gear for transmitting rotational movement of the crankshaft into rotational movement of the spool shaft, and a drag-adjusting knob threaded on said crankshaft, characterized by:

means for signaling the turning of said drag-adjusting knob relative to said crankshaft, said means comprising (a) a click spring carried on one of said drag-adjusting knob and said crankshaft, said click spring having a portion freely projecting radially, (b) a disc-shaped member carried by the other of said crankshaft and drag-adjusting knob for rotation therewith, said disc-shaped member having serrations extending into overlapping relationship with said freely projecting portion of said click spring, and (c) said drag-adjusting knob, when turned relative to said crankshaft will produce a clicking sound and clicking sensation in the drag-adjustment knob as the click spring snaps from one serration to the next on the disc-shaped member to signal the change in the adjustment of the drag between the crank handle and the spool.

* * * * *